United States Patent
Hoshi et al.

(10) Patent No.: US 12,330,533 B2
(45) Date of Patent: Jun. 17, 2025

(54) BRAKING CONTROL DEVICE FOR A VEHICLE AND VEHICLE WITH BRAKING CONTROL

(71) Applicant: HONDA MOTOR CO., LTD., Tokyo (JP)

(72) Inventors: Yoichi Hoshi, Wako (JP); Kazuya Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 17/952,953

(22) Filed: Sep. 26, 2022

(65) Prior Publication Data
US 2023/0095519 A1 Mar. 30, 2023

(30) Foreign Application Priority Data
Sep. 30, 2021 (JP) .................................. 2021-161723

(51) Int. Cl.
*B60L 7/26* (2006.01)
*B60L 58/12* (2019.01)

(52) U.S. Cl.
CPC ................. *B60L 7/26* (2013.01); *B60L 58/12* (2019.02); *B60L 2240/36* (2013.01); *B60L 2240/547* (2013.01); *B60L 2240/642* (2013.01)

(58) Field of Classification Search
None
See application file for complete search history.

(56) References Cited

U.S. PATENT DOCUMENTS

2020/0122728 A1 4/2020 Murase
2020/0164880 A1 5/2020 Cho

FOREIGN PATENT DOCUMENTS

| DE | 102016004804 A1 | * | 10/2017 | ................ B60T 1/10 |
| JP | 2007-253715 A | | 10/2007 | |
| JP | 2010202004 A | * | 9/2010 | ............. B60K 6/365 |
| JP | 2012-76636 A | | 4/2012 | |
| JP | 2018-187964 A | | 11/2018 | |
| JP | 2020-65379 A | | 4/2020 | |

(Continued)

OTHER PUBLICATIONS

Translation of DE 102016004804 (Year: 2017).*

(Continued)

*Primary Examiner* — Peter D Nolan
*Assistant Examiner* — Michael F Whalen
(74) *Attorney, Agent, or Firm* — Rankin, Hill & Clark LLP

(57) ABSTRACT

A vehicle includes a regenerative brake of a rotating electric machine and a friction brake which is a mechanical brake as braking means for applying a braking force to rotations of the left and right wheels at the front and rear of the vehicle. The vehicle also includes an SOC information obtaining part that obtains an amount of charge (SOC) of a battery of the vehicle and an ECU. The ECU may include a VSA modulator and an ACC-ECU that generate, without a braking operation of the driver, a regenerative braking force with the regenerative brake and a friction braking force with the friction brake. The ECU prohibits an operation of the VSA modulator and/or an operation of the ACC-ECU according to a temperature of the friction brake and the amount of charge (SOC) of the battery.

15 Claims, 8 Drawing Sheets

(56) References Cited

FOREIGN PATENT DOCUMENTS

JP          2020-199814 A      12/2020
WO    WO-2020229252 A1 *  11/2020

OTHER PUBLICATIONS

Translation of JP 2010202004 (Year: 2010).*
Japanese Office Action received in corresponding Japanese application No. 2021-161723 dated Apr. 18, 2023 with English translation (10 pages).

* cited by examiner

BRAKING CONTROL DEVICE FOR A VEHICLE AND VEHICLE WITH BRAKING CONTROL

CROSS-REFERENCE STATEMENT

The present application is based on, and claims priority from, Japanese Patent Application Number 2021-161723, filed Sep. 30, 2021, the disclosure of which is hereby incorporated by reference herein in its entirety.

BACKGROUND

Technical Field

The disclosure is related to a braking control device for a vehicle and a vehicle with braking control.

Related Art

There are vehicles among hybrid electric vehicles (HEVs), which make a combined use of an engine and a rotating electric machine as a drive source, and electric vehicles (EVs), which only use a rotating electric machine as a drive source, that are capable of being accelerated and decelerated by a driver by operating an accelerator pedal alone.

Wheels of a vehicle are each installed with a friction brake such as a disc brake. Such a friction brake may include a brake disc that rotates with a wheel and brake pads that are configured so that the brake disc may be sandwiched between the brake pads. With this friction brake, when a driver presses a brake pedal, the brake pads become pressed against the brake disc through hydraulic pressure supplied from a master cylinder causing frictional resistance to be generated between the brake pads and the brake disc. Through this frictional resistance, braking force is applied to a rotation of the wheel causing the vehicle to decelerate or stop.

A travel control technology called Adaptive Cruise Control (ACC) is known as an elemental technology for realizing automated driving. With a travel control device that includes an ACC function, travel control including constant-speed travel control and follow-traffic-ahead travel control are realized through integrated control of the drive system and brake system of the vehicle installed with the travel control device (the "host vehicle"). Note that the constant-speed travel control controls the host vehicle to travel at constant speed based on a target vehicle speed and the follow-traffic-ahead travel control controls the host vehicle to travel by maintaining a predetermined vehicle-to-vehicle distance with another vehicle travelling ahead of the host vehicle. When it is detected that the host vehicle has become close to a preceding vehicle, the ACC controls the brake system of the host vehicle to automatically decelerate the host vehicle.

With such ACC, engine braking is also used in order to suppress the heating of brake pads and so on of the friction brake and to reduce deceleration shock at an early stage of deceleration. When a requested amount of deceleration from automated braking is less than a predetermined value (for example, a braking force limit of engine braking), braking force is applied using engine braking. When the requested amount of deceleration is equal to or greater than the predetermined value, deceleration is performed in accordance with the requested amount of deceleration from a constant speed travel/vehicle-to-vehicle distance control device by changing from engine braking to friction braking.

Patent Literature 1 (Japanese Unexamined Patent Application Publication No. 2020-199814) discloses a braking control device for a vehicle that is equipped with a regenerative brake and friction brake. When the temperature of the friction brake is low, the braking control device disclosed in Patent Literature 1 activates the friction brake to raise its temperature by reducing regenerative braking and so on.

FIG. 10 shows a relationship between brake pad friction (hereinafter "brake friction") and brake pad temperature (hereinafter "brake temperature").

When a vehicle (a "following vehicle") with an ACC function performs the follow-traffic-ahead travel control with respect to a preceding vehicle, brake temperature of the following vehicle (with an ACC function) does not rise in the "normal usage region" that is indicated with an arrow a in FIG. 10.

However, in cases where the following vehicle (with an ACC function) travels continuously along a downhill slope, brake temperature rises in the "continuous-downhill-slope usage region" that is indicated by an arrow b in FIG. 10 and effectiveness of the friction brake drops with a rise in brake temperature (see arrow c of FIG. 10).

Conventional braking control devices for a vehicle have the following issues.

(1) The braking control device for a vehicle disclosed in Patent Literature 1 is not capable of responding to situations where the friction brake is at a high temperature.

(2) In the case of vehicles that are capable of automated driving or ACC in which friction braking is applied regardless of an operation by a driver, frequent friction braking will cause the driver to feel discomfort when the driver operates the brake pedal. For example, as shown in FIG. 10, when a vehicle continuously travels downhill, brake temperature rises and with this rise the effectiveness of the friction brake declines. When the driver is operating the brake, the driver will be able to feel the gradual decline in effectiveness of the friction brake. However, when the ACC (automated braking) is being used and the driver depresses the brake pedal, for example, to stop at a tollgate, the driver might experience discomfort or fear due to the decline in effectiveness. Therefore, there is a lack of predictability towards the decline in braking effectiveness.

(3) In the case of vehicles that are equipped with a regenerative brake and friction brake, there is a need to appropriately actuate or cancel automated driving or ACC in accordance with an amount of charge of a battery, the regenerative brake, or the like.

SUMMARY

A braking control device for a vehicle according to an embodiment is a braking control device for a vehicle that includes a braking controller configured to generate, without a driver performing a braking operation, regenerative braking force from a regenerative brake and friction braking force from a friction brake. The braking control device for a vehicle includes: a battery charge amount obtaining part configured to obtain an amount of charge of a battery of the vehicle; and a processor. The processor is configured with a program to perform operations including: an operation as a brake temperature estimator configured to estimate a brake temperature of the friction brake; and an operation as a brake protection controller configured to prohibit an operation of the braking controller in accordance with a temperature of the friction brake and the amount of charge of the battery, the temperature of the friction brake being the brake temperature that has been estimated by the brake temperature estimator.

DRAWINGS

Figure 5:
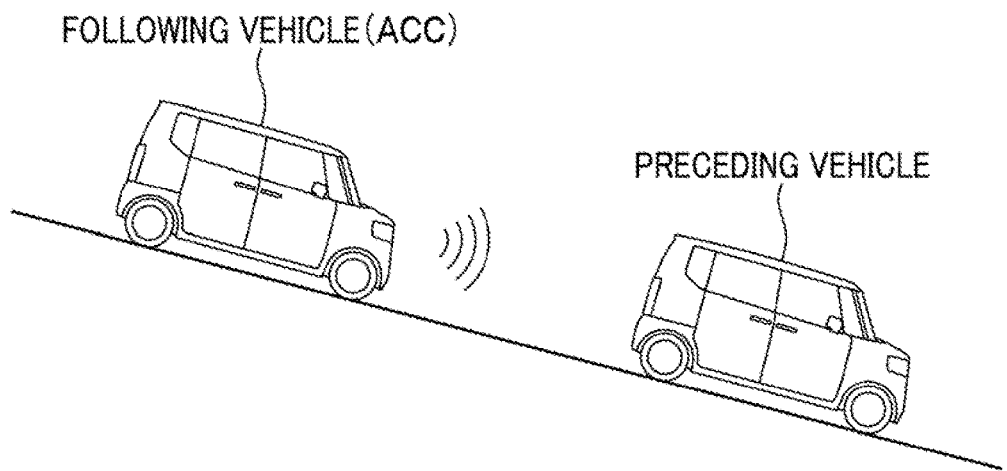

FIG. 5 shows a drawing of two vehicles: a following vehicle that is installed with an ACC function and is traveling behind a preceding vehicle; and the preceding vehicle that is installed with a braking control device for a vehicle (a vehicle) that is in accordance with an embodiment. The drawing shows the following vehicle (ACC) whose ACC function is performing the follow-traffic-ahead travel control with respect to the preceding vehicle along a continuously downhill slope.

Figure 6:
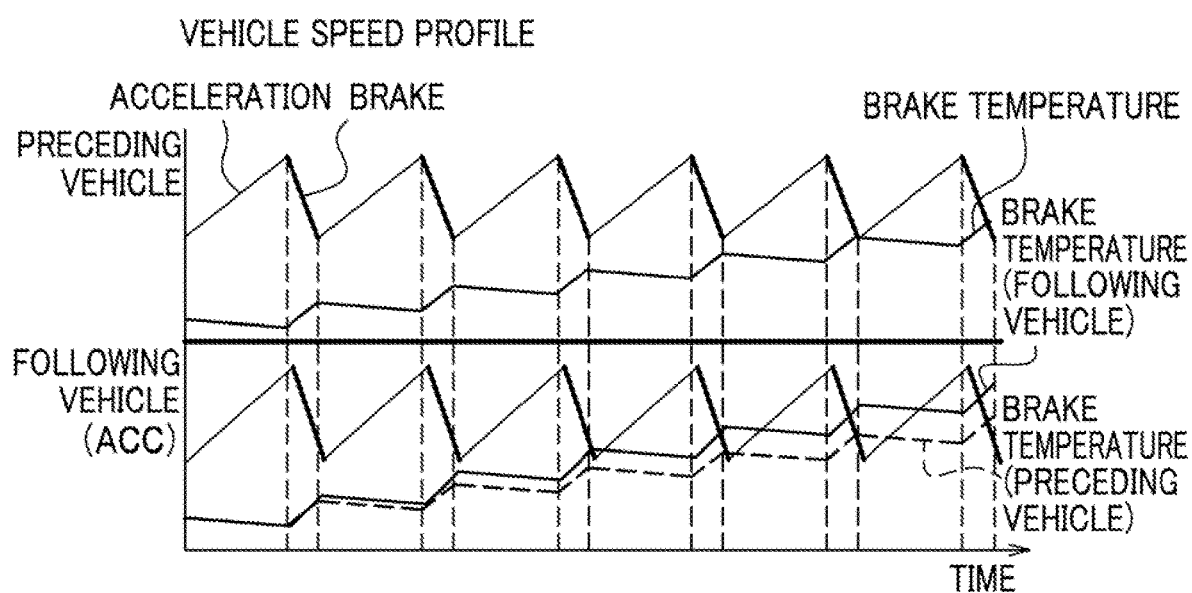

FIG. 6 shows a timing chart that describes why brake temperature is prone to increasing during ACC use when a vehicle is travelling on a continuously downhill slope of FIG. 5.

Figure 7:
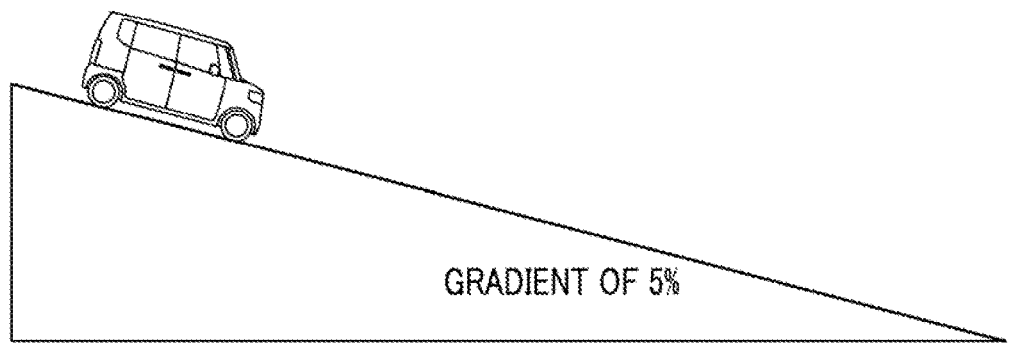

FIG. 7 shows a drawing in which a driver request is to keep a constant speed along a slope with a 5% gradient.

Figure 8:
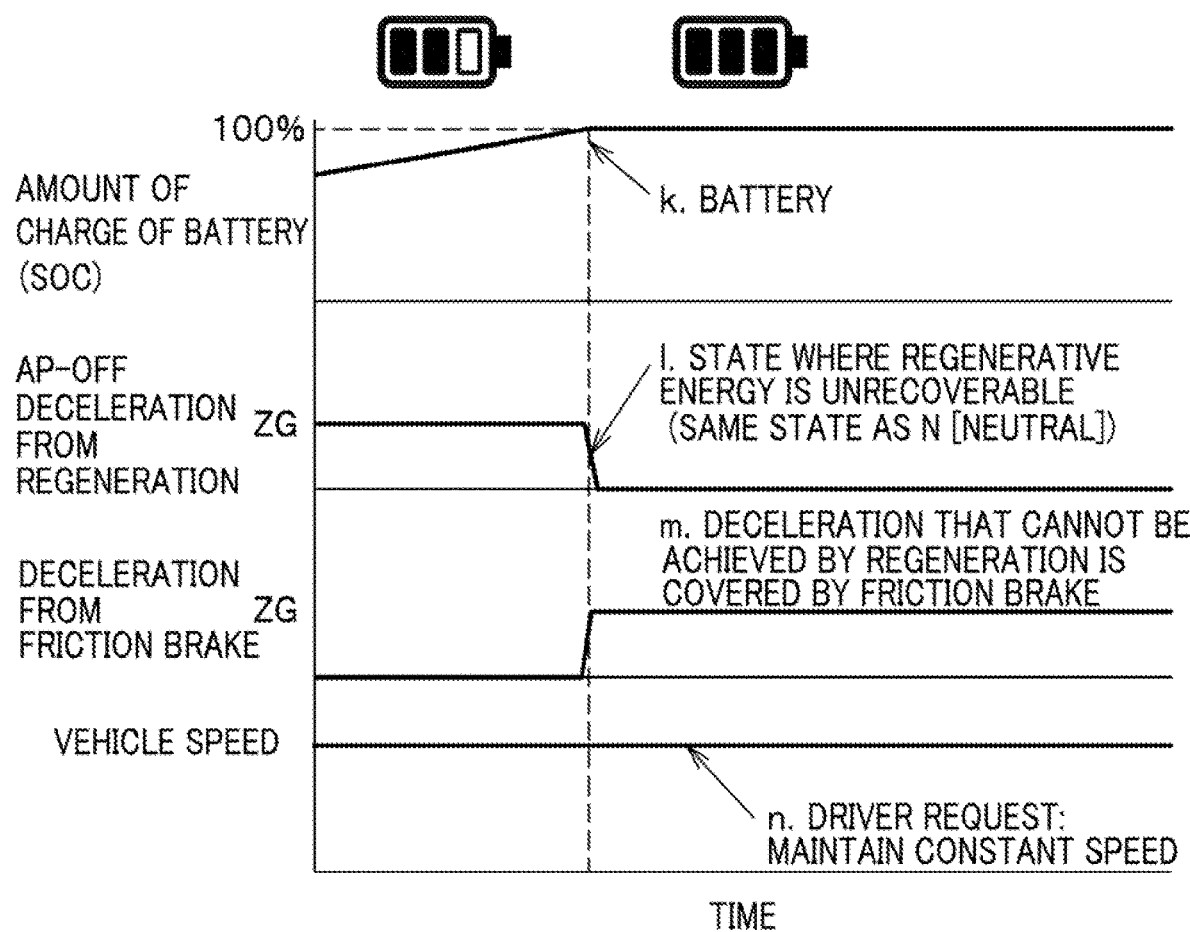

FIG. 8 is a timing chart showing an amount of battery charge (state of charge, SOC) behavior, behavior of AP-OFF deceleration by regeneration, behavior of deceleration by a friction brake, and vehicle speed behavior over time when a vehicle is travelling on a slope as shown in FIG. 7 and the battery becomes fully charged (a state where regeneration is limited).

Figure 9:
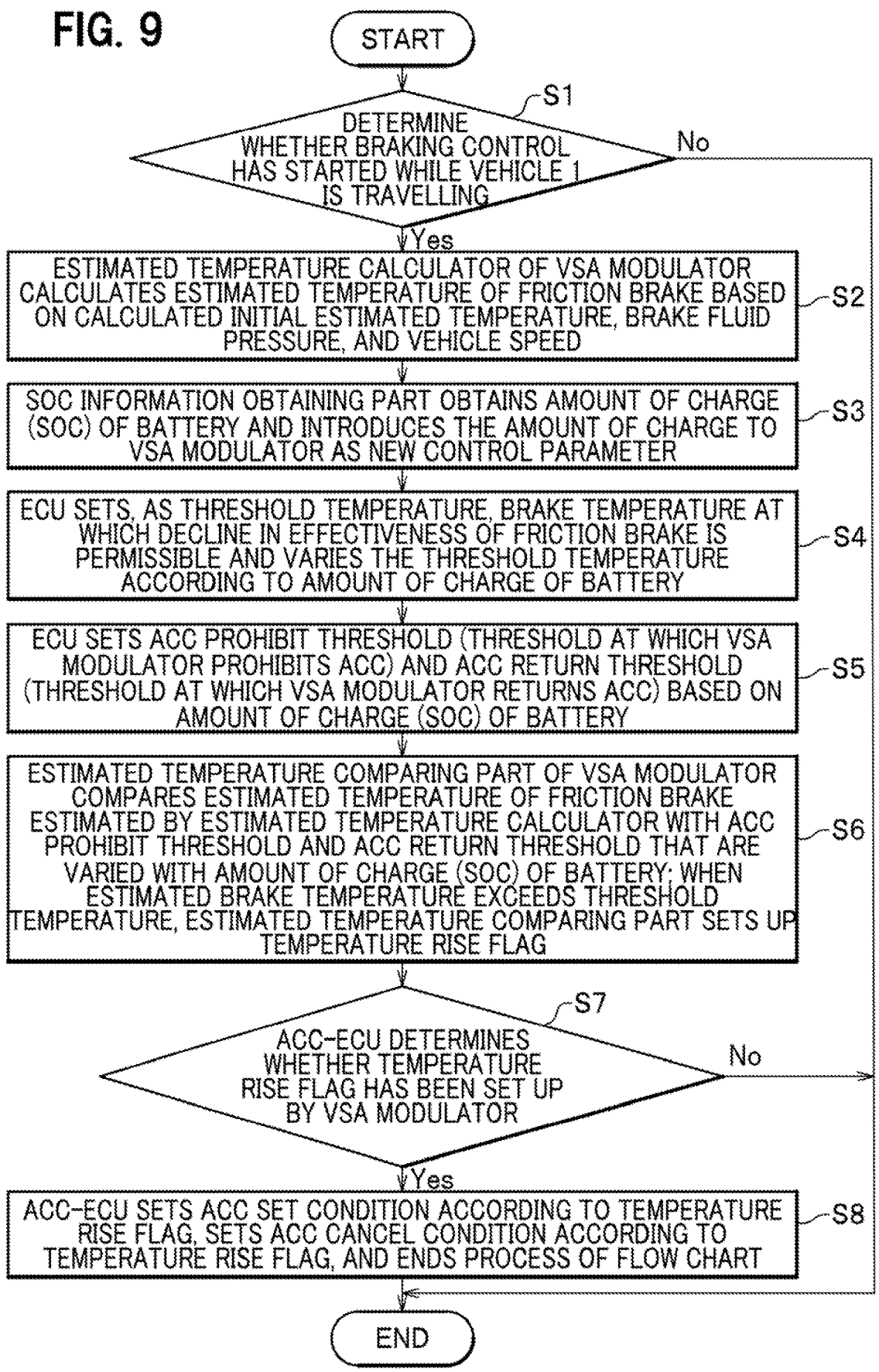

FIG. 9 is a flow chart showing an operation of a brake protection control of a braking control device for a vehicle (a vehicle) in accordance with an embodiment.

Figure 10:
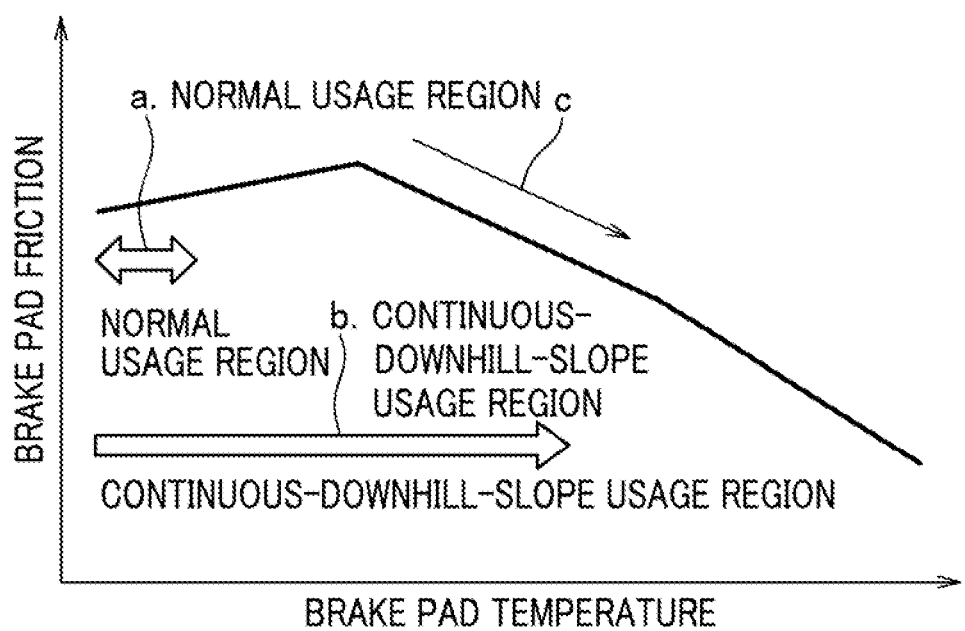

FIG. 10 shows a diagram describing a relationship between brake pad friction and brake pad temperature according to conventional technology.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the disclosure will be described below with reference to the drawings as appropriate. In the drawings, common components will be designated with the same reference sign and overlapping explanations thereof will be omitted.

Figure 1:
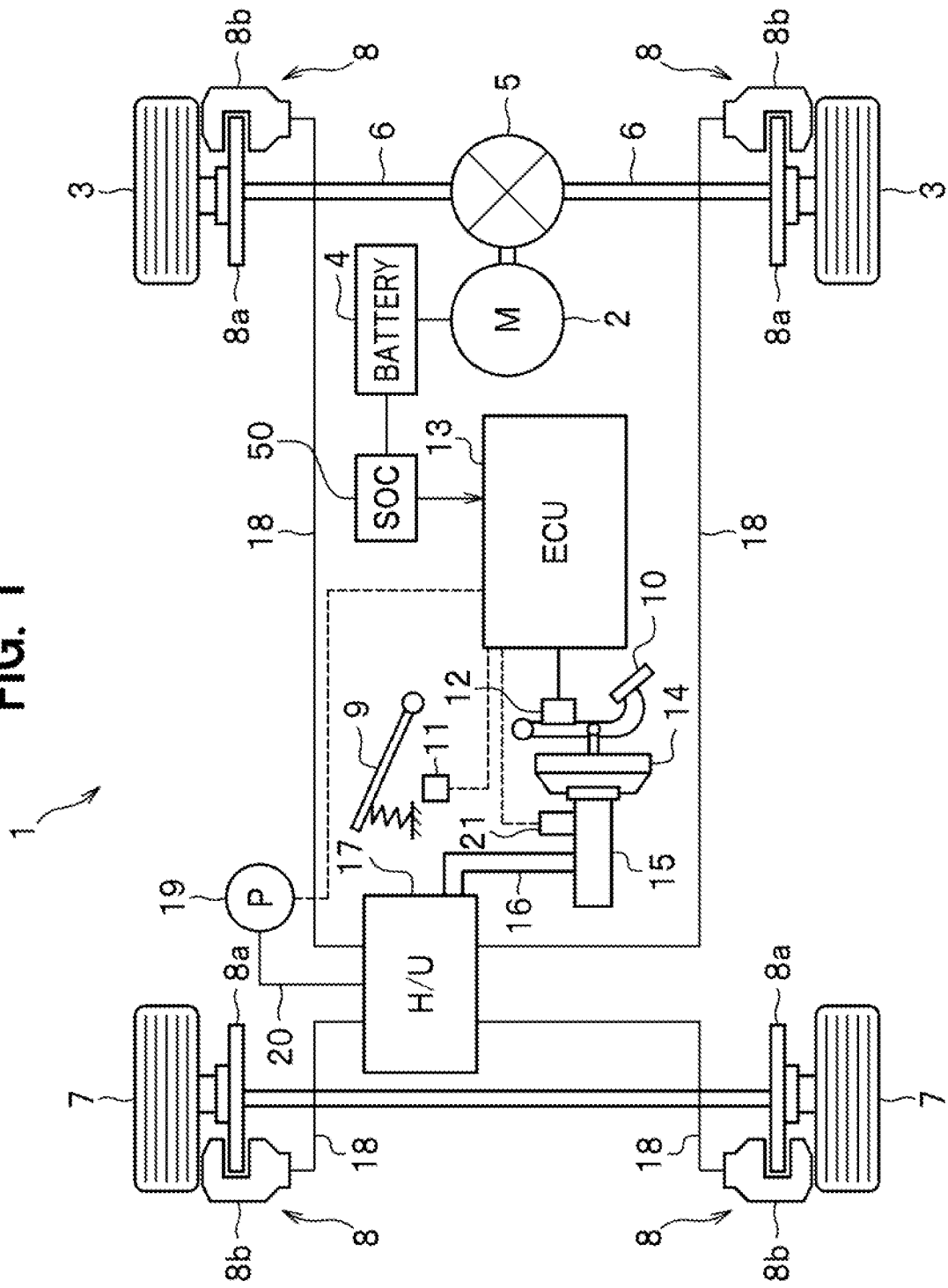
FIG. 1 is a plan view schematically showing an overall configuration of a vehicle that is installed with a braking control device for a vehicle that is in accordance with an embodiment.

FIG. 1 is a plan view schematically showing an overall configuration of a vehicle that is installed with a braking control device for a vehicle that is in accordance with an embodiment. The braking control device for a vehicle is extensively integrated into the vehicle 1. The braking control device for a vehicle may, due to the integrated nature thereof, be considered as the vehicle itself or may be considered as being installed on the vehicle 1.

The vehicle 1 according to the embodiment is an electric vehicle (including a hybrid vehicle and a fuel-cell vehicle).

The vehicle 1 travels by applying a rotational drive to left and right rear wheels 3 using a rotating electric machine (a motor) 2 as a drive source. The rotating electric machine 2 functions as a generator as well. The rotating electric machine 2 is electrically connected to a battery 4 and operates with electricity supplied from the battery 4.

The battery 4 is configured to supply electricity to individual components of the vehicle 1 (discharge of electricity) and to store regenerative electric power generated through regeneration control of the vehicle 1 (charging).

The amount of charge of the battery 4 (state of charge [SOC]; also referred to as the level of charge, rate of charge) is detected by an SOC information obtaining part 50 (battery charge amount obtaining part).

Rotational driving force outputted by the rotating electric machine 2 is distributed and transmitted individually to the left and right axles 6 by a differential device (a differential) 5. Rotations of the left and right axles 6 are transmitted to the left and right rear wheels 3 that are attached to the ends of these axles 6. In this way, the left and right rear wheels 3 are applied with rotational drive, and the vehicle 1 travels at a predetermined speed.

Left and right front wheels 7 and left and right rear wheels 3 of the vehicle 1 are each equipped with a friction brake 8 that is used to apply a mechanical brake to the above-described rotation. Each friction brake 8 is a disc brake and is configured to include a brake disc 8a and brake pads (a brake caliper) 8b. The disc brake 8a is flat and circular in shape and is configured to rotate with a front wheel 7 or rear wheel 3. The brake pads 8b of each friction brake 8 are configured to sandwich and squeeze against a corresponding brake disc 8a with hydraulic pressure so that frictional resistance is generated between the brake disc 8a and the brake pads 8b.

The vehicle 1 is equipped with an accelerator pedal 9 and a brake pedal 10 that are operable by a driver of the vehicle 1. Close to the accelerator pedal 9 is installed an accelerator position detection sensor 11 that is configured to detect an amount by which the accelerator pedal 9 is depressed (accelerator position). The brake pedal 10 is equipped with a brake switch 12 that is configured to detect whether the brake pedal 10 is depressed (ON/OFF). The accelerator position detection sensor 11 and brake switch 12 are electrically connected to an electronic control unit (ECU) 13 (braking control device for a vehicle, brake protection controller) that make up the braking control device for a vehicle according to an embodiment. The amount of charge of the battery 4 is detected with an SOC information obtaining part 50 and is inputted to the ECU 13.

Electronic Control Unit (ECU) 13

The ECU 13 is activated (the power thereof is turned on) when an ignition switch IG is on (ON) and stops operating (the power thereof is turned off) when the ignition switch IG is off (OFF). The ECU 13 performs various types of control over the vehicle 1 from when the ECU 13 is activated by turning on (ON) the ignition switch IG to when the ECU 13 stops operation by turning off (OFF) the ignition switch IG.

The ECU 13 is an electronic control device that is composed of a microcomputer. The ECU 13 is configured from an LSI device that includes a microprocessor, ROM (read-only memory), RAM (random-access memory), a timer that is configured to measure time from when the brake switch 12 becomes OFF, a brake temperature estimator that is configured to estimate a temperature of the friction brake 8, and an ACC brake protection controller. The ECU 13, for example, realizes a braking controller, a brake temperature estimator, and a brake protection controller (described below) by executing a program stored in the ROM.

The ECU 13 includes a braking controller that generates a regenerative braking force from a regenerative brake and a friction braking force from a friction brake 8 without a braking operation of a driver.

The braking controller is composed of a VSA modulator (a vehicle behavior stabilizing device; "VSA" is a registered trademark of the Applicant) 100 (braking controller, braking control device for a vehicle), an ACC-ECU 200 (braking controller, braking control device for a vehicle). The VSA modulator 100 and ACC-ECU 200 will be described later with reference to FIG. 2.

In some embodiments, the ECU 13 is configured to include the ACC-ECU 200 (braking controller, braking control device for a vehicle) that will be described later with reference to FIG. 2.

The ECU 13 includes a function as a brake protection controller that is configured to prohibit an operation of the VSA modulator 100 or an operation of the ACC-ECU 200 or operations of the VSA modulator 100 and ACC-ECU 200 according to the amount of charge of a battery 4 and the temperature of the friction brake 8.

As the brake protection controller, the ECU 13 prohibits the operation of the braking controller when the temperature of the friction brake 8 is equal to or greater than a predetermined temperature and the amount of charge of the battery 4 is equal to or greater than a predetermined amount.

As the brake protection controller, the ECU 13 operates the regenerative brake to a second predetermined amount (for example, SOC of approximately 90%) that is greater than a first predetermined amount (for example, SOC of approximately 80%) when the temperature of the friction brake 8 is equal to or greater than the predetermined temperature and the amount of charge of the battery 4 is equal to or greater than the first predetermined amount.

As the brake protection controller, the ECU 13 determines that the vehicle 1 is travelling on a downhill slope (the vehicle 1 is descending) when the amount of charge of the battery 4 increases continuously.

As the brake protection controller, the ECU 13 sets, as a threshold temperature, a brake temperature at which a decline in effectiveness of the friction brake 8 is permissible. Furthermore, the threshold temperature is made variable and is changed by the ECU 13 according to the amount of charge of the battery 4. When the brake temperature that is estimated by an estimated temperature calculator 110 (see FIG. 2) exceeds the threshold temperature, the ECU 13 sets up a flag and prohibits an operation of the braking controller.

This prohibiting of the operation of the braking controller involves disabling an operation of the VSA modulator 100 or an operation of the ACC-ECU 200 or operations of the VSA modulator 100 and ACC-ECU 200 or cancelling an operation of the VSA modulator 100 that is running or an operation of the ACC-ECU 200 that is running or operations of the VSA modulator 100 and ACC-ECU 200 that are running.

A master cylinder 15 is connected to the brake pedal 10 via a brake booster 14. A hydraulic piping 16 that extends from the master cylinder 15 is connected to a hydraulic unit (H/U) 17. Four sets of hydraulic piping 18 that extends from the hydraulic unit (H/U) 17 are connected to the brake pads 8b of individual friction brakes 8. A hydraulic pump 19 is connected to the hydraulic unit (H/U) 17. This hydraulic pump 19 is connected to the hydraulic unit (H/U) 17 via hydraulic piping 20. The driving of the hydraulic pump 19 is controlled through an instruction from the ECU 13. The master cylinder 15 is installed with a hydraulic pressure sensor 21 that detects hydraulic pressure within the master cylinder 15. This hydraulic pressure sensor 21 is connected electrically to the ECU 13.

When a driver presses down on the brake pedal 10, a hydraulic pressure of a size corresponding to the amount of depression of the brake pedal 10 is generated in the master cylinder 15. This hydraulic pressure is supplied to each friction brake 8 via the hydraulic piping 16, hydraulic unit (H/U) 17, and hydraulic piping 18, and the brake pads 8b of each friction brake 8 are pressed against a corresponding brake disc 8a. As a result, frictional resistance (frictional braking force) is generated by individual friction brakes 8, and braking force is applied with this frictional resistance to the rotations of the left and right front wheels 7 and left and right rear wheels 3.

The ECU 13 is capable, when required to as will be described later, of driving the hydraulic pump 19 to drive the friction brake 8 so that braking force is applied to the rotations of the left and right front wheels 7 and left and right rear wheels 3 without having the brake pedal 10 depressed by the driver.

When the vehicle 1 decelerates, the rotating electric machine 2 functions as a generator and recovers a part of kinetic energy as electrical energy (regenerative energy), during which time the rotating electric machine (generator) 2 functions as a regenerative brake.

Figure 2:
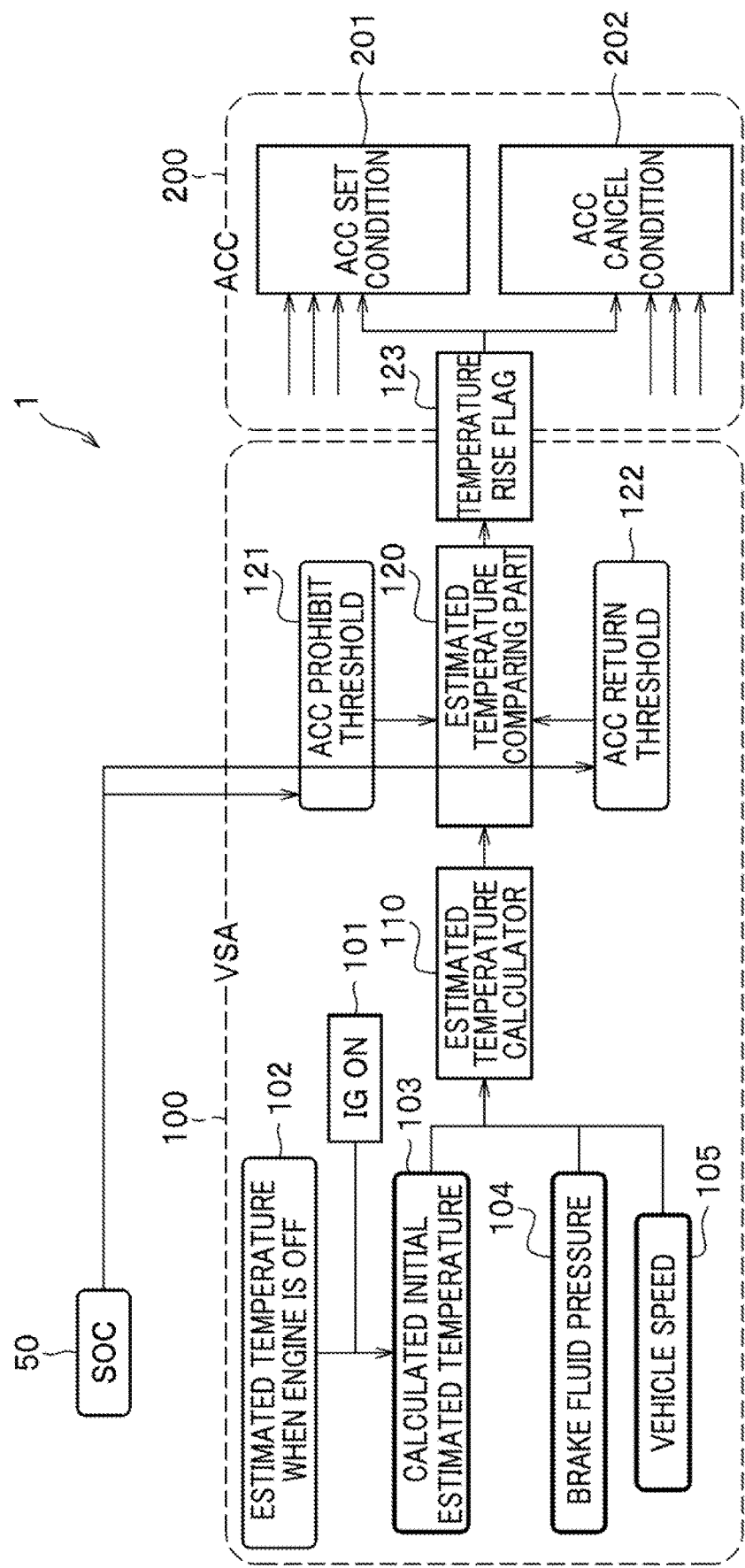
FIG. 2 is a block diagram showing a configuration of a vehicle installed with a braking control device for a vehicle that is in accordance with an embodiment.

FIG. 2 is a block diagram showing a configuration of a vehicle 1 installed with a braking control device for a vehicle that is in accordance with an embodiment.

As shown in FIG. 2, the vehicle 1 that is installed with a braking control device for a vehicle includes a VSA modulator 100 and an ACC-ECU 200. The VSA modulator 100 is configured to stabilize vehicle behavior by controlling braking fluid pressure of a fluid supply path of a braking fluid pressure system. The ACC-ECU 200 is configured to perform adaptive cruise control (ACC) that includes: constant-speed travel control that controls the host vehicle (the vehicle installed with the ACC function) to travel at constant speed based on a vehicle speed that is set beforehand; and follow-traffic-ahead travel control that controls the host vehicle to follow a preceding vehicle that travels in the same direction in the same lane as the host vehicle by maintaining a predetermined vehicle-to-vehicle distance with the preceding vehicle.

The VSA modulator 100 is configured to include: an input part (omitted in the figure); an estimated temperature calculator 110 (brake temperature estimator); an estimated temperature comparing part 120 (brake protection controller), an ACC prohibit threshold 121, an ACC return threshold 122, a temperature rise flag 123. The input part detects, as input elements, ON activation (power on) of the ignition switch IG 101; an estimated temperature when engine is OFF 102; a calculated initial estimated temperature 103, a brake fluid pressure 104, and vehicle speed 105. The calculated initial estimated temperature 103 is calculated from the estimated temperature when engine is OFF 102 at the time of ON activation of the ignition switch IG 101.

The estimated temperature calculator 110 calculates an estimated temperature of the friction brake 8 (see FIG. 1) based on the calculated initial estimated temperature 103, brake fluid pressure 104, and vehicle speed 105.

The estimated temperature comparing part 120 compares the estimated temperature of the friction brake 8 that is estimated by the estimated temperature calculator 110 with the ACC prohibit threshold 121 and ACC return threshold 122. When the brake temperature that is estimated by the estimated temperature calculator 110 exceeds the ACC prohibit threshold 121 or ACC return threshold 122 or the ACC prohibit threshold 121 and ACC return threshold 122 (threshold temperatures), the temperature rise flag 123 is set up.

The ACC prohibit threshold 121 is a control parameter that is used to prohibit the ACC based on the SOC information obtaining part 50. The ACC return threshold 122 is a control parameter that is used to return to the ACC based on the SOC information obtaining part 50.

The ACC-ECU 200 sets an ACC set condition 201 according to whether the temperature rise flag 123 is set up. The ACC-ECU 200 sets an ACC cancel condition 202 according to whether the temperature rise flag 123 is set up.

The ECU 13 may be configured to include the ACC-ECU 200.

An operation of a brake protection controller of a braking control device for a vehicle (a vehicle) will be described below.

ACC Brake Protection Control of Comparative Example

An ACC brake protection control of a comparative example will be described below.

A braking control device for a vehicle (a vehicle) according to the comparative example is configured in the same way as the braking control device for a vehicle (a vehicle) as shown in FIG. 2 but with the SOC information obtaining part 50 removed.

Figure 3:
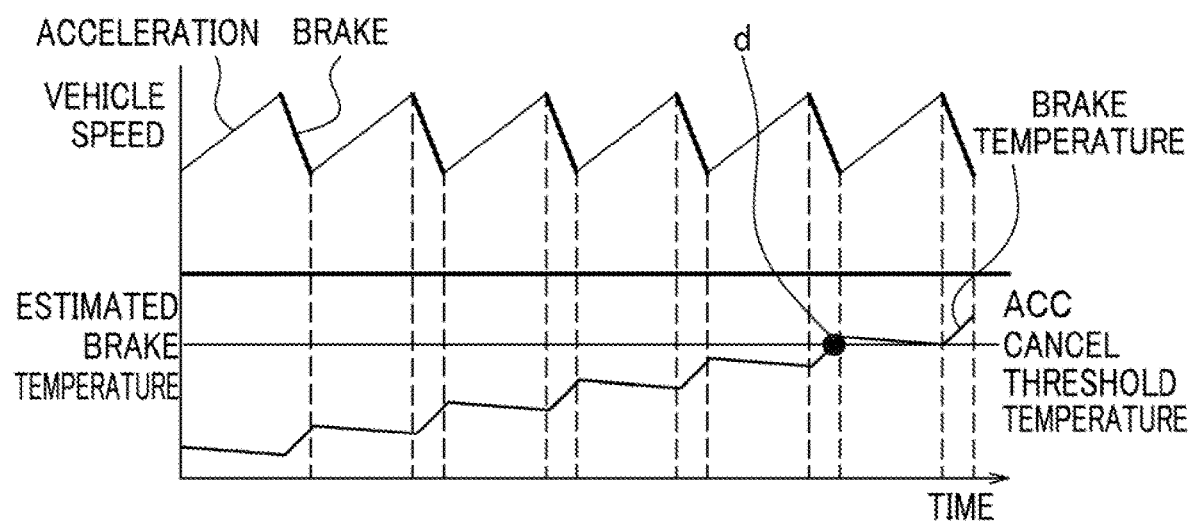
FIG. 3 is a timing chart that describes ACC brake protection control of a braking control device for a vehicle (a vehicle) that is in accordance with a comparative example.

FIG. 3 is a timing chart for describing an ACC brake protection control of the braking control device for a vehicle (a vehicle) of the comparative example. An estimated brake temperature and vehicle speed are shown on the vertical axes and time is shown on the horizontal axis.

As shown in the upper part of FIG. 3, the vehicle of the comparative example repeats acceleration (see parts of the line for vehicle speed where the line is drawn with smaller thickness) and braking (see parts of the line for vehicle speed where the line is drawn with greater thickness) through adaptive cruise control (ACC) that controls a host vehicle (a vehicle installed with the ACC function) to travel at constant speed based on a predetermined vehicle speed.

The VSA modulator of the vehicle according to the comparative example estimates brake temperature from vehicle speed and brake fluid pressure. The VSA modulator of the vehicle according to the comparative example sets, as an ACC cancel threshold temperature, a brake temperature at which a decline in braking effectiveness is permissible.

As shown in the lower part of FIG. 3, temperature of the friction brake 8 (estimated brake temperature) rises gradually. When the estimated brake temperature exceeds the ACC cancel threshold temperature, the VSA modulator of the vehicle according to the comparative example sets up a temperature rise flag (see reference sign d of FIG. 3) and cancels the ACC function.

Points Regarding ACC Brake Protection Control

Points to note regarding the ACC brake protection control will be described below.

Figure 4:
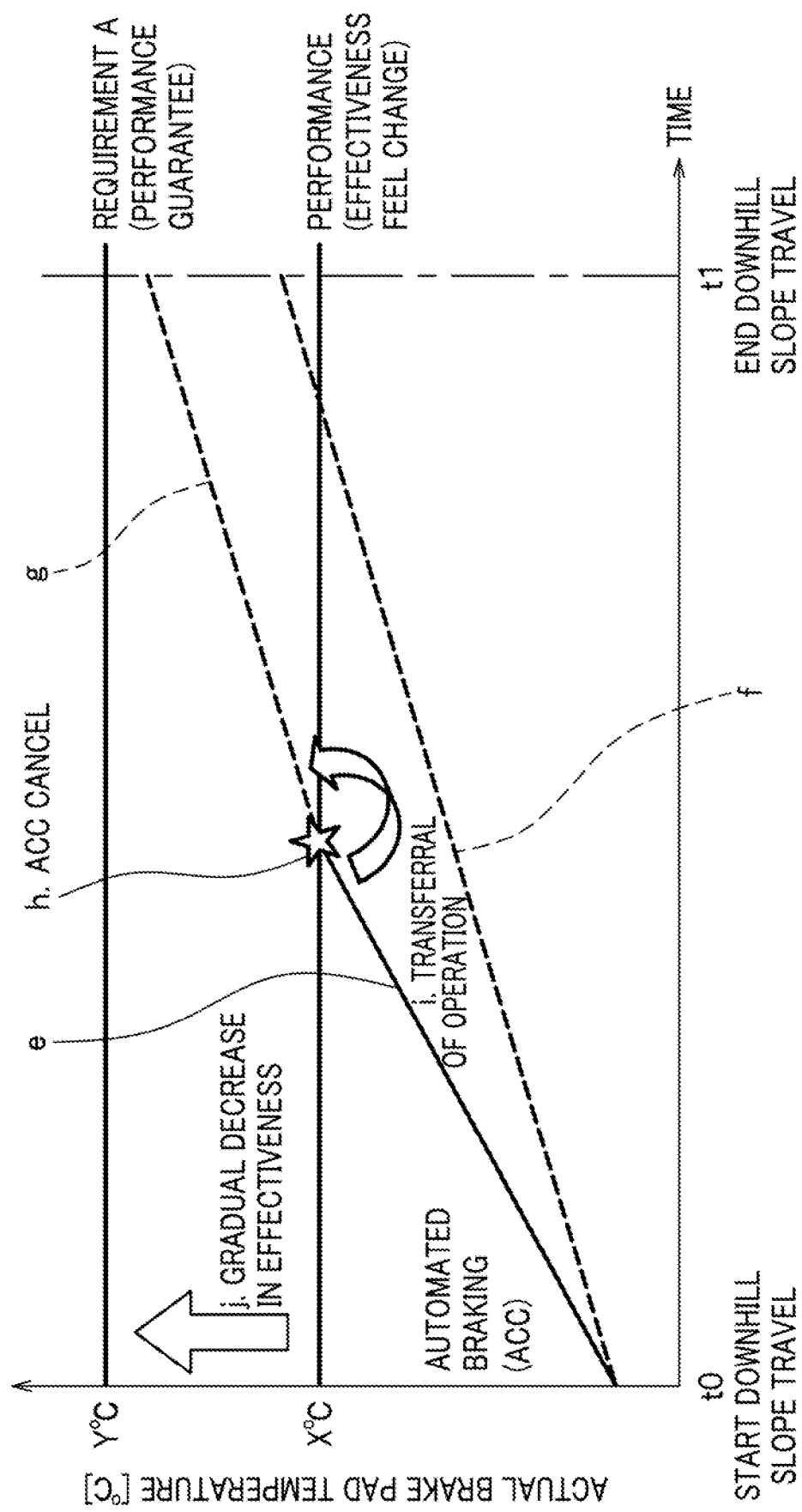
FIG. 4 is a timing chart that describes ACC brake protection control of a braking control device (vehicle) for a vehicle that is in accordance with an embodiment.

FIG. 4 is a timing chart for describing notable points regarding the ACC brake protection control. In FIG. 4, actual brake pad temperature is shown on the vertical axis and time from t0, time when a downhill slope travel starts, to t1, time when the downhill slope travel ends, is shown on the horizontal axis.

A threshold temperature Y° C. for satisfying requirement A for performance guarantee is set for the actual brake pad temperature. The threshold temperature Y° C. is used to ensure the performance of the friction brake. For a guaranteed performance of the friction brake, the actual brake pad temperature should not exceed the threshold temperature Y° C.

The thick line that is indicated with a reference sign e in FIG. 4 shows a rise in brake temperature when automated braking (ACC) is used but ACC is later cancelled while travelling on a downhill slope.

The thick dotted lines indicated with reference signs f and g show rises in brake temperature when a driver is operating the braking of a vehicle. The thick dotted line indicated with reference sign f in FIG. 4 shows a brake temperature rise for a case where braking operation is carried out by the driver alone from time to, time when a downhill slope travel starts, to time t1, time when the downhill slope travel ends. The thick dotted line indicated with reference sign g in FIG. 4 shows a brake temperature rise during a period when braking operation is performed by the driver from the time when operation is transferred from the ACC to the driver until time t1 (time when the downhill slope travel ends).

The brake temperature rise of the line with reference sign e (of FIG. 4) is a case where automated braking (ACC) is used. The brake temperature rises of the lines with reference signs f and g (of FIG. 4) are cases where braking operation is carried out by the driver. By comparing the brake temperature rise of reference sign e with the brake temperature rises of reference signs f and g, it can be seen that the brake temperature rise is steeper for a case where automated braking (ACC) is used. In other words, when ACC is used and the vehicle travels under the follow-traffic-ahead travel control, brake temperature becomes higher compared to when braking is carried out through driver operation. The reason why brake temperature is prone to rise when ACC is in use while a vehicle travels continuously on a downhill slope will be described later.

When the actual brake pad temperature exceeds X° C., a temperature that meets a performance requirement for a braking-effectiveness-feel change, the ACC function is cancelled (see reference sign h of FIG. 4), and operation is transferred from the ACC to the driver (see reference sign i of FIG. 4). The driver to whom the operation is transferred is able to predict a decline in braking effectiveness.

When the actual brake pad temperature exceeds the temperature X° C., which is the temperature at which the ACC function is cancelled due to performance (braking-effectiveness-feel change), braking effectiveness gradually declines (see reference sign j of FIG. 4).

Braking performance after the ACC function is cancelled is as follows.

After the ACC function is cancelled, operation is performed by the driver as indicated by reference sign g of FIG. 4. By keeping the maximum brake temperature below or at Y° C. while the vehicle is travelling on the downhill slope, braking efficiency and so on are guaranteed through brake temperature.

In this way, braking performance and predictability of a decline in braking effectiveness are secured through ACC brake protection control.

Reason why Brake Temperature is Prone to Rise During ACC Use when Travelling on a Downhill Slope The reason why brake temperature is prone to rise during ACC use when a vehicle is travelling on a downhill slope will be described.

FIG. 5 shows a drawing of two vehicles: a preceding vehicle; and a following vehicle that is installed with an ACC function and is traveling behind the preceding vehicle. The drawing shows the following vehicle (ACC) performing the follow-traffic-ahead travel control with respect to the preceding vehicle along a continuously downhill slope.

FIG. 6 shows a timing chart that describes why brake temperature is prone to increase during ACC use when a vehicle is travelling on a continuously downhill slope of FIG. 5. The vertical axis shows brake temperature (estimated brake temperatures) and vehicle speed for the preceding vehicle and following vehicle (ACC), and the horizontal axis shows time.

As shown in the upper part of FIG. 6, brake temperature of the preceding vehicle rises through the use of ACC during downhill slope travel. The lower part of FIG. 6 shows brake temperature of the preceding vehicle and the following vehicle (ACC). As shown in the lower part of FIG. 6, brake temperature of the following vehicle (ACC) rises through the use ACC during downhill slope travel.

As shown in the lower part of FIG. 6, a vehicle speed profile of the following vehicle (ACC) widens (=deceleration width increases). Because of this, brake temperature of the following vehicle (ACC) is prone to rise when using the ACC.

Behavior Change During Downhill Slope Travel when Battery Becomes Fully Charged (State of Regeneration Restriction)

A change in behavior during downhill slope travel when a battery becomes fully charged (a state of regeneration restriction) will be described.

FIG. 7 shows a drawing in which a driver request is to keep a constant speed for a vehicle travelling along a slope with a 5% gradient.

FIG. 8 is a timing chart showing an amount of battery charge (state of charge, SOC) behavior, AP-OFF deceleration behavior due to regeneration, deceleration behavior due to a friction brake, and vehicle speed behavior over time when a vehicle is travelling on a slope as shown in FIG. 7 and the battery becomes fully charged (a state where regeneration is restricted).

As indicated by the "vehicle speed" of FIG. 8, a request of the driver is to maintain a constant speed. Because the vehicle is travelling on a downhill slope, an engine brake or a regenerative brake and a friction brake are used to maintain the constant speed.

When Battery is not Fully Charged

As shown by the "amount of charge of battery (SOC)" of FIG. 8, when the battery of the vehicle is not fully charged, AP-OFF deceleration through regeneration is possible, and AP-OFF deceleration through regeneration is performed. Accordingly, as shown by "deceleration from friction brake" of FIG. 8, deceleration through a friction brake is not performed. Note that an amount of AP-OFF deceleration through regeneration is small and is shown in FIG. 8 as a deceleration amount ZG.

When Battery is Fully Charged

As shown by the "amount of charge of battery (SOC)" of FIG. 8, when the battery of the vehicle is fully charged, the vehicle is in a state where regeneration is not possible (in the same state as neutral), and AP-OFF deceleration through regeneration cannot be obtained. As shown by "deceleration from friction brake" of FIG. 8, deceleration through the friction brake is used to cover the lack of deceleration through regeneration. Because of this, brake temperature rises.

When a vehicle travels on a downhill slope such as that shown in FIG. 7, a rise in brake temperature becomes high when the battery is in a fully charged state and the driver request is to maintain a constant speed.

Flow Chart

FIG. 9 is a flow chart showing an operation of a brake protection control of a braking control device for a vehicle (a vehicle) in accordance with an embodiment.

In step S1, the ECU 13 (brake protection controller) determines whether braking control has begun while the vehicle 1 is travelling. In the case where the braking control does not start while vehicle 1 is travelling, the process of the flow chart ends.

When the braking control has begun, the estimated temperature calculator 110 (brake temperature estimator) of the VSA modulator 100 (see FIG. 2) calculates, in step S2, estimated temperature of the friction brake 8 (see FIG. 1) based on the calculated initial estimated temperature 103, brake fluid pressure 104, and vehicle speed 105.

In step S3, the SOC information obtaining part 50 (see FIG. 2) obtains an amount of charge (state of charge, SOC) of the battery 4 (see FIG. 1) and introduces the amount of charge to the VSA modulator 100 (see FIG. 2) as a new control parameter.

In step S4, the ECU 13 (brake protection controller) sets a brake temperature at which a decline in effectiveness of the friction brake 8 is permissible as a threshold temperature and varies the threshold temperature according to the amount of charge of the battery 4.

In step S5, the ECU 13 sets the ACC prohibit threshold 121, a threshold at which the VSA modulator 100 prohibits the ACC, and the ACC return threshold 122, a threshold at which the VSA modulator 100 returns the ACC, based on the amount of charge of the battery 4 (state of charge, SOC).

In step S6, the estimated temperature comparing part 120 (brake protection controller) of the VSA modulator 100 compares the estimated temperature of the friction brake 8 that has been estimated by the estimated temperature calculator 110 with the ACC prohibit threshold 121 and ACC return threshold 122. When the estimated brake temperature exceeds either of or both of the threshold temperatures (the ACC prohibit threshold 121 and ACC return threshold 122), the estimated temperature comparing part 120 (brake protection controller) sets up a temperature rise flag 123.

In step S7, the ACC-ECU 200 determines whether the temperature rise flag 123 has been set up by the VSA modulator 100 based on the friction brake temperature and the amount of charge of the battery 4. When the temperature rise flag 123 has not been set up, the process of the flow chart ends.

When the temperature rise flag 123 has been set up, the ACC-ECU 200, in step S8, sets an ACC set condition 201 according to the temperature rise flag 123 and sets an ACC cancel condition 202 according to the temperature rise flag 123 and ends the process of the flow chart.

In this way, the ECU 13 (brake protection controller) sets up a flag when the brake temperature that has been estimated by the estimated temperature calculator 110 exceeds a threshold temperature (at least one of the ACC prohibit threshold 121 or the ACC return threshold 122) and prohibits an operation of the VSA modulator 100 (braking controller).

Advantageous Effect

The object of the disclosure is to provide a braking control device for a vehicle and a vehicle capable of braking control that enable a driver of the vehicle to recognize a current operational state of a brake.

An embodiment according to the disclosure enables a driver to recognize the current operational state of the brake.

As described above, a vehicle 1 (braking control device for a vehicle) according to an embodiment (see FIG. 1) includes the following braking means for applying a braking force to the rotations of the left and right front wheels 7 and left and right rear wheels 3: a regenerative brake by a rotating electric machine 2; and a friction brake 8 that is a mechanical brake. The vehicle 1 according to the embodiment also includes an SOC information obtaining part 50 that obtains an amount of charge (SOC) of a battery 4 of the vehicle 1 and an ECU 13 (brake protection controller). The ECU 13 includes a VSA modulator 100 and an ACC-ECU 200 (FIG. 2) that generate a regenerative braking force (with the regenerative brake by the rotating electric machine 2) and a friction braking force (with the friction brake 8) without a braking operation of the driver. The ECU 13 prohibits an operation of the VSA modulator 100 or an operation of the ACC-ECU 200 or operations of the VSA modulator 100 and ACC-ECU 200 according to a temperature of the friction brake 8 and an amount of charge (state of charge, SOC) of a battery 4 of the vehicle 1. The prohibiting of operation by the ECU 13 includes, for example, disabling at least one of an operation of the VSA modulator 100 or an operation of the ACC-ECU 200 or cancelling at least one of a running operation of the VSA modulator 100 or a running operation of the ACC-ECU 200.

Through the configuration described above, the vehicle 1 according to an embodiment performs brake protection control not only based on brake temperature (as is the case with conventional technology), but also on a state of charge (SOC) of the battery 4. In one or more embodiments, a slope descent is determined based on a change (an increase) in the SOC, and an ACC function is terminated in accordance with the SOC and a determination of a slope descent. In this way, the driver is able to recognize the current operational state of the brake. For example, a vehicle 1 according to an embodiment can lessen in advance a decline in braking effectiveness when the driver presses down on the brake pedal after the vehicle 1 has been travelling continuously on a downhill slope, thereby preventing an unexpected brake feel.

In one or more embodiments, the ECU 13 sets an ACC prohibit threshold 121 and ACC return threshold 122, which are used by the VSA modulator 100 to prohibit the ACC and return the ACC respectively, based on the amount of charge (SOC) of the battery 4. The ACC prohibit threshold 121 and ACC return threshold 122 are control parameters that have been used in conventional technology, although in conventional technology the amount of charge (SOC) of the battery 4 is not taken into account in said control parameters. Because of this, the brake protection control according to an embodiment is usable as an extension to conventional control methods, is versatile, and is applicable at a low cost and without requiring a system change.

The ECU 13 (brake protection controller) of a vehicle 1 (braking control device for a vehicle) according to an embodiment prohibits an operation of the VSA modulator 100 (braking controller) or an operation of the ACC-ECU 200 (braking controller) or operations of the VSA modulator 100 and ACC-ECU 200 when a temperature of the friction brake 8 is equal to or greater than a predetermined temperature and an amount of charge (SOC) of the battery 4 is equal to or greater than a predetermined amount.

As shown in FIG. 8, when the battery 4 is fully charged, the regenerative brake cannot operate and braking can be performed by the friction brake 8 only. By cancelling automated driving or the like before the rise in brake temperature becomes large, the vehicle 1 according to an embodiment enables the driver to recognize the operational state of the brake.

The ECU 13 (brake protection controller) of a vehicle 1 (braking control device for a vehicle) according to an embodiment operates the regenerative brake until the amount of charge (state of charge, SOC) of the battery 4 reaches a second predetermined amount that is greater than a first predetermined amount when a temperature of the friction brake 8 is greater or equal to a predetermined temperature and the amount of charge (state of charge, SOC) of the battery 4 is greater or equal to the first predetermined amount.

Ordinarily, in order to protect the battery 4, an SOC of approximately 80% (the first predetermined amount) is considered to indicate a fully charged battery 4 (for example, a driver of the vehicle 1 is given indication that the battery 4 is fully charged when the SOC is approximately 80%), and regenerative braking is discontinued thereat. However, because the battery 4 is still functionally capable of recharging, regeneration is continued until the SOC reaches 90% (the second predetermined amount), thereby protecting the friction brake 8 (in other words, priority is given to protecting the friction brake 8 over protecting the battery 4). In this way, the driver is capable of recognizing the current operational state of the brake more clearly.

The ECU 13 (brake protection controller) of a vehicle 1 (braking control device for a vehicle) according to an embodiment determines that the vehicle 1 is travelling on a downhill slope when the amount of charge (state of charge, SOC) of the battery 4 increases successively.

For example, by determining a downhill slope of FIG. 5, when the vehicle 1 according to an embodiment is the following vehicle (ACC) of FIG. 6, brake protection control can be applied promptly and the rise in brake temperature that arise from a following vehicle (ACC) using ACC can be suppressed more quickly.

The ECU 13 (brake protection controller) of a vehicle 1 (braking control device for a vehicle) according to an embodiment sets a brake temperature at which a decline in effectiveness of the friction brake 8 is allowable as a threshold temperature and varies the threshold temperature according to the amount of charge (SOC) of the battery 4. When the brake temperature that has been estimated by the estimated temperature calculator 110 exceeds the threshold temperature, the ECU 13 sets a flag up and prohibits an operation of the VSA modulator 100 (braking controller) or an operation of the ACC-ECU 200 (braking controller) or operations of the VSA modulator 100 and ACC-ECU 200 (braking controller). The prohibiting of operation by the ECU 13 (brake protection controller) includes, for example, disabling an operation of the VSA modulator 100 (braking controller) or an operation of the ACC-ECU 200 (braking controller) or operations of the VSA modulator 100 and ACC-ECU 200 (braking controller) or cancelling a running operation of the VSA modulator 100 (braking controller) or a running operation of the ACC-ECU 200 (braking controller) or running operations of the VSA modulator 100 and ACC-ECU 200 (braking controller).

In this way, the ECU 13 (brake protection controller) disables an operation of the VSA modulator 100 and/or an operation of the ACC-ECU 200 (disables an operation of the braking controller) or cancels a running operation of the VSA modulator 100 and/or a running operation of the ACC-ECU 200 (cancels a running operation of the braking controller).

The above embodiments have been described with details provided to aid the understanding of the disclosure. Embodiments of the disclosure are not limited to those with all the described configurations. For example, the embodiments have been described using a downhill slope as an example but are applicable to flat roads as well.

What is claimed is:

1. A braking control device for a vehicle that includes a braking controller configured to generate, without a driver performing a braking operation, regenerative braking force from a regenerative brake and friction braking force from a friction brake, the braking control device for a vehicle comprising:
   a battery charge amount obtaining part configured to obtain an amount of charge of a battery of the vehicle; and
   a processor configured with a program to perform operations comprising:
      operation as a brake temperature estimator configured to estimate a brake temperature of the friction brake; and
      operation as a brake protection controller configured to prohibit an operation of the braking controller in accordance with the estimated brake temperature of the friction brake and the amount of charge of the battery, wherein
   in response to a successive increase in the amount of charge of the battery, the brake protection controller is configured to determine that the vehicle is travelling on a downhill slope.

2. The braking control device for a vehicle according to claim 1, wherein
   the brake protection controller is configured to prohibit the operation of the braking controller in response to the brake temperature of the friction brake being greater or equal to a predetermined temperature and the amount of charge of the battery is greater or equal to a predetermined amount.

3. The braking control device for a vehicle according to claim 2, wherein
   in response to the brake temperature of the friction brake being greater or equal to a first predetermined temperature and the amount of charge of the battery being greater or equal to a first predetermined amount, the brake protection controller is configured to operate the regenerative brake until the amount of charge of the battery reaches a second predetermined amount, the second predetermined amount being greater than the first predetermined amount.

4. The braking control device for a vehicle according to claim 2, wherein
   the brake protection controller is configured to set a brake temperature of the friction brake at which a decline in effectiveness of the friction brake is allowable as a threshold temperature, wherein
   the brake protection controller is configured to vary the threshold temperature according to the amount of charge of the battery, and wherein
   in response to the estimated brake temperature that has been estimated by the brake temperature estimator exceeding the threshold temperature, the brake protection controller is configured to set up a flag and prohibit the operation of the braking controller.

5. The braking control device for a vehicle according to claim 2, wherein
   the prohibiting of operation by the brake protection controller includes at least one of disabling the braking controller from operating or cancelling a running operation of the braking controller.

6. The braking control device for a vehicle according to claim 1, wherein
   in response to the brake temperature of the friction brake being greater or equal to a predetermined temperature and the amount of charge of the battery being greater or equal to a first predetermined amount, the brake protection controller is configured to operate the regenerative brake until the amount of charge of the battery reaches a second predetermined amount, the second predetermined amount being greater than the first predetermined amount.

7. The braking control device for a vehicle according to claim 6, wherein
   the brake protection controller is configured to set a brake temperature of the friction brake at which a decline in effectiveness of the friction brake is allowable as a threshold temperature, wherein
   the brake protection controller is configured to vary the threshold temperature according to the amount of charge of the battery, and wherein
   in response to the estimated brake temperature that has been estimated by the brake temperature estimator exceeding the threshold temperature, the brake protection controller is configured to set up a flag and prohibit the operation of the braking controller.

8. The braking control device for a vehicle according to claim 6, wherein
   the prohibiting of operation by the brake protection controller includes at least one of disabling the braking controller from operating or cancelling a running operation of the braking controller.

9. The braking control device for a vehicle according to claim 1, wherein
   the prohibiting of operation by the brake protection controller includes at least one of disabling the braking controller from operating or cancelling a running operation of the braking controller.

10. The braking control device for a vehicle according to claim 1, wherein
    braking control by the braking controller includes at least one of braking control by automated driving or braking control by an ACC function.

11. The braking control device for a vehicle according to claim 1, wherein
    the brake temperature estimator is configured to estimate the brake temperature from vehicle speed and brake fluid pressure.

12. A vehicle with braking control that is equipped with the braking control device for a vehicle according claim 1.

13. A braking control device for a vehicle that includes a braking controller configured to generate, without a driver performing a braking operation, regenerative braking force from a regenerative brake and friction braking force from a friction brake, the braking control device for a vehicle comprising:
    a battery charge amount obtaining part configured to obtain an amount of charge of a battery of the vehicle; and
    a processor configured with a program to perform operations comprising:
       operation as a brake temperature estimator configured to estimate a brake temperature of the friction brake; and
       operation as a brake protection controller configured to prohibit an operation of the braking controller in accordance with the estimated brake temperature of the friction brake and the amount of charge of the battery, wherein the brake protection controller is configured to set a brake temperature of the friction brake at which a decline in effectiveness of the friction brake is allowable as a threshold temperature, wherein the brake protection controller is configured to vary the threshold temperature according to the amount of charge of the battery, and wherein in response to the estimated brake temperature that has been estimated by the brake temperature estimator exceeding the threshold temperature, the brake protection controller is configured to set up a flag and prohibit the operation of the braking controller.

14. The braking control device for a vehicle according to claim 13, wherein the prohibiting of operation by the brake protection controller includes at least one of disabling the braking controller from operating or cancelling a running operation of the braking controller.

15. A vehicle with braking control that is equipped with the braking control device for a vehicle according claim 2.

* * * * *